US009430571B1

United States Patent
Carter et al.

(10) Patent No.: US 9,430,571 B1
(45) Date of Patent: Aug. 30, 2016

(54) GENERATING TRAVEL QUERIES IN RESPONSE TO FREE TEXT QUERIES

(71) Applicant: Google Inc., Mountain View, CA (US)

(72) Inventors: James Carter, Boston, MA (US); Rodney S. Daughtrey, Cambridge, MA (US)

(73) Assignee: GOOGLE INC., Mountain View, CA (US)

( * ) Notice: Subject to any disclaimer, the term of this patent is extended or adjusted under 35 U.S.C. 154(b) by 99 days.

(21) Appl. No.: 13/659,838

(22) Filed: Oct. 24, 2012

(51) Int. Cl.
*G06F 17/30* (2006.01)

(52) U.S. Cl.
CPC .............................. *G06F 17/30867* (2013.01)

(58) Field of Classification Search
CPC .................. G06F 17/30864; G06F 17/30867; G06F 17/30463
USPC ........................................ 707/706, 713, 736
See application file for complete search history.

(56) References Cited

U.S. PATENT DOCUMENTS

| 5,729,458 | A  | * | 3/1998  | Poppen ........................ 705/400 |
| 6,307,572 | B1 |   | 10/2001 | DeMarcken et al. |
| 6,327,589 | B1 | * | 12/2001 | Blewett et al. |
| 6,826,472 | B1 | * | 11/2004 | Kamei et al. ................. 701/426 |
| 7,263,664 | B1 |   | 8/2007  | Daughtrey |
| 7,346,526 | B2 |   | 3/2008  | Daughtrey |
| 7,840,426 | B2 |   | 11/2010 | Daughtrey |
| 7,933,895 | B2 | * | 4/2011  | Amjadi ........................ 707/722 |
| 7,996,419 | B2 |   | 8/2011  | Pfleger |
| 8,732,222 | B2 | * | 5/2014  | Horvitz et al. ............... 707/899 |

| 2002/0069118 | A1 | 6/2002  | Zylstra |
| 2003/0212737 | A1 | 11/2003 | Moricz et al. |
| 2004/0078251 | A1 | 4/2004  | DeMarcken |
| 2004/0230451 | A1 | 11/2004 | Figa |
| 2007/0106497 | A1 | 5/2007  | Ramsey et al. |
| 2007/0130124 | A1 | 6/2007  | Ramsey et al. |

(Continued)

FOREIGN PATENT DOCUMENTS

| WO |      01/33408 A2 | 5/2001 |
| WO | WO2008109257 A1  | 9/2008 |
| WO |   2012/095613 A1 | 7/2012 |

OTHER PUBLICATIONS

Finkelstein et al, "Placing Search in Context: The Concept Revisited", WWW10, May 1-5, 2001, 9 pages.*

(Continued)

*Primary Examiner* — Rehana Perveen
*Assistant Examiner* — Loc Tran
(74) *Attorney, Agent, or Firm* — Johnson, Marcou & Isaacs, LLC

(57) ABSTRACT

Methods, systems, and apparatus, including computer programs encoded on computer storage media, for generating travel queries in response to free text queries. One of the methods includes receiving a free text query; generating a travel query from the free text query, wherein the travel query expressly specifies an origin location, a destination location, and a departure date, wherein each of the origin location, the destination location, and the departure date are expressly identified as such in the travel query; and submitting the travel query to a travel search engine. Optionally the method includes obtaining user information about a user associated with the free text query, obtaining popular travel information, and deriving origin or destination locations, or departure or return dates from the free text query, the user information, and the popular-travel information.

30 Claims, 8 Drawing Sheets

(56) References Cited

U.S. PATENT DOCUMENTS

| | | | |
|---|---|---|---|
| 2007/0156469 | A1 | 7/2007 | Bird et al. |
| 2007/0198308 | A1 | 8/2007 | Crean et al. |
| 2008/0033770 | A1 | 2/2008 | Barth et al. |
| 2008/0126080 | A1* | 5/2008 | Saldanha et al. ............... 704/9 |
| 2008/0167906 | A1 | 7/2008 | De Marcken |
| 2008/0222119 | A1 | 9/2008 | Dai et al. |
| 2008/0222566 | A1 | 9/2008 | Daughtrey et al. |
| 2009/0119001 | A1 | 5/2009 | Moussaeiff et al. |
| 2009/0150343 | A1 | 6/2009 | English et al. |
| 2009/0192917 | A1 | 7/2009 | Wolkin |
| 2009/0216577 | A1* | 8/2009 | Killebrew ...................... 705/7 |
| 2009/0271226 | A1* | 10/2009 | De Marcken ........ G06Q 10/047 705/5 |
| 2011/0119593 | A1* | 5/2011 | Jacobson et al. ............ 715/736 |
| 2011/0125725 | A1 | 5/2011 | Daughtrey et al. |
| 2012/0265433 | A1* | 10/2012 | Viola et al. ................. 701/410 |
| 2013/0268517 | A1 | 10/2013 | Madhavan |
| 2013/0344896 | A1* | 12/2013 | Kirmse ............. G06F 17/3087 455/456.3 |
| 2014/0052714 | A1 | 2/2014 | Brodziak et al. |

OTHER PUBLICATIONS

U.S. Appl. No. 13/979,638 to Brodziak et al. filed Oct. 24, 2013.
U.S. Appl. No. 13/688,085 to Ben-Haim et al. filed Nov. 28, 2012.
Baharlou, "International Preliminary Report on Patentability issued in International Application No. PCT/FR2012/050084", mailed on Jul. 25, 2013, 7 pages.
Fiorenzo, "European Office Action issued in European Application No. 12705329.6 mailed on Aug. 7, 2015", 7 pages.
Fiorenzo, "International Search Report and Written Opinion issued in International Application No. PCT/FR2012/050084", mailed on Apr. 27, 2012, 9 pages.
Mina, "U.S. Office Action issued in copending U.S. Appl. No. 13/979,638, filed Oct. 24, 2013", mailed Dec. 31, 2015, 12 pages.
Mina, "U.S. Office Action issued in copending U.S. Appl. No. 13/979,638, filed Oct. 24, 2013", mailed Jun. 23, 2015, 15 pages.
Tallman, "U.S. Office Action issued in copending U.S. Appl. No. 13/688,085, filed Nov. 28, 2012", mailed Mar. 6, 2015, 16 pages.
Tallman, "U.S. Office Action issued in copending U.S. Appl. No. 13/688,085, filed Nov. 28, 2012", mailed Sep. 1, 2015, 20 pages.

\* cited by examiner

GENERATING TRAVEL QUERIES IN RESPONSE TO FREE TEXT QUERIES

BACKGROUND

This specification relates generally to query processing.

Internet travel search engines are used to plan travel. Users submit travel queries to Internet travel search engines and are presented with travel query results that satisfy the travel queries. The travel query results can include travel options that cover different aspects of travel, e.g., flights, hotels, car rentals, and activities.

Conventionally, users enter specific kinds of travel constraints, e.g., origin, destination, departure date, duration of stay, into corresponding fields in Internet travel search engine user interfaces in order to define a travel search query. However, these travel search engines are unable to return useful travel results for travel search queries that are not adequately defined by travel constraints.

SUMMARY

This specification describes technologies relating to generating travel queries in response to free text queries.

In general, one innovative aspect of the subject matter described in this specification can be embodied in methods that include the actions of receiving a free text query; generating a travel query from the free text query, wherein the travel query expressly specifies an origin location, a destination location, and a departure date, wherein each of the origin location, the destination location, and the departure date are expressly identified as such in the travel query; and submitting the travel query to a travel search engine. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

The free text query is text in a natural language form.

The methods further include obtaining user information about a user associated with the free text query; obtaining popular-travel information, wherein the popular-travel information is information about travel that is popular with users; and generating the travel query from the free text query, the user information, and the popular-travel information. The popular-travel information is information about travel that is popular with users who share one or more characteristics with the user.

The user information identifies at least one of user travel preferences; user location; past user origin locations; past user destination locations; past user travel cost for travel that comprises the past user origin locations and the past user destination locations; past user destination types; past user departure dates; past user durations of stay; or user contacts and the location of the contacts. Generating the travel query includes generating a travel query for air travel, and wherein, when the user information identifies past user origin locations and past user destination locations, the past user origin locations and past user destination locations comprise cities that have airports. When the user information identifies past user destination types, the past user destination types comprise beach destinations, skiing destinations, mountain destinations, national park destinations, or romantic destinations. When the user information identifies user contacts and the location of the contacts, the operations further include obtaining information identifying the user contacts and the location of the contacts from one or more social networks of the user.

The popular-travel information identifies at least one of popular origin locations; popular destination locations; estimated travel cost for travel that comprises the popular origin locations and the popular destination locations; popular destination types; popular departure dates; popular durations of stay; or events and the location of the events. When the popular-travel information identifies popular origin locations, the operations further include selecting the popular origin locations from all origin locations within a predetermined maximum distance from a current user location, wherein the predetermined maximum distance is measured in terms of time of travel, cost of travel, or distance of travel from the current user location. When the popular-travel information identifies popular destination locations, the operations further include selecting the popular destination locations from all destination locations outside a predetermined minimum distance from a current user location, wherein the predetermined minimum distance is measured in terms of time of travel, cost of travel, or distance of travel from the current user location. When the popular-travel information identifies popular destination types, the popular destination types comprise beach destinations, skiing destinations, mountain destinations, national park destinations, or romantic destinations. When the popular-travel information identifies events and the locations of the events, the operations further include obtaining information identifying the events and the location of the events from an online database of events. The popular-travel information further identifies weather conditions at the popular destination locations for a plurality of dates.

In general, another innovative aspect of the subject matter described in this specification can be embodied in a system that includes one or more computers and one or more storage devices storing instructions that when executed by the one or more computers cause the one or more computers to perform the operations of receiving a free text query; generating a travel query from the free text query, wherein the travel query expressly specifies an origin location, a destination location, and a departure date, wherein each of the origin location, the destination location and the departure date are expressly identified as such in the travel query; and submitting the travel query to a travel search engine. Other embodiments of this aspect include corresponding methods, apparatus, and computer programs recorded on one or more computer storage devices, each configured to perform the operations. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

The travel query further expressly specifies a duration of stay or a return date, wherein the duration of stay or return date is expressly identified as such.

The system further includes one or more of an origin-location derivation module, wherein, when the system includes the origin-location derivation module, generating the travel query includes deriving the origin location by the origin-location derivation module; a destination-location derivation module, wherein, when the system includes the destination-location derivation module, generating the travel query includes deriving the destination location by the destination-location derivation module; and a departure-date derivation module, wherein, when the system includes the departure-date derivation module, generating the travel query includes deriving the departure date by the departure-date derivation module. The origin-location derivation module, the destination-location module, and the departure-date derivation module are a single module. The origin-location derivation module is configured to perform operations including obtaining user information about a user associated with the free text query; obtaining popular-travel information, wherein the popular-travel information is information about travel that is popular with users; and deriving the origin location from the free text query, the user information, and the popular-travel information. The destination-location derivation module is configured to perform operations including obtaining user information about a user associated with the free text query; obtaining popular-travel information, wherein the popular-travel information is information about travel that is popular with users; and deriving the destination location from the free text query, the user information, and the popular-travel information. The departure-date derivation module is configured to perform operations including obtaining user information about a user associated with the free text query; obtaining popular-travel information, wherein the popular-travel information is information about travel that is popular with users; and deriving the departure date from the free text query, the user information, and the popular-travel information. The travel query further expressly specifies a duration of stay or a return date, wherein the duration of stay or return date is expressly identified as such, and wherein the system further includes a return-date derivation module, wherein generating the travel query includes deriving the return-date by the return-date derivation module. The return-date derivation module is configured to perform operations including obtaining user information about a user associated with the free text query; obtaining popular-travel information, wherein the popular-travel information is information about travel that is popular with users; and deriving the return date from the free text query, the user information, and the popular-travel information.

The operations further include obtaining user information about a user associated with the free text query; obtaining popular-travel information, wherein the popular-travel information is information about travel that is popular with users; and deriving one or more of the origin location, the destination location, and the departure date from the free text query, the user information, and the popular-travel information.

The subject matter described in this specification can be implemented in particular embodiments so as to realize one or more of the following advantages. Free text queries can be submitted in natural language. Travel constraints that define travel queries can be derived from free text queries. Travel queries can be generated from derived travel constraints. Travel search results can be returned for free text queries.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
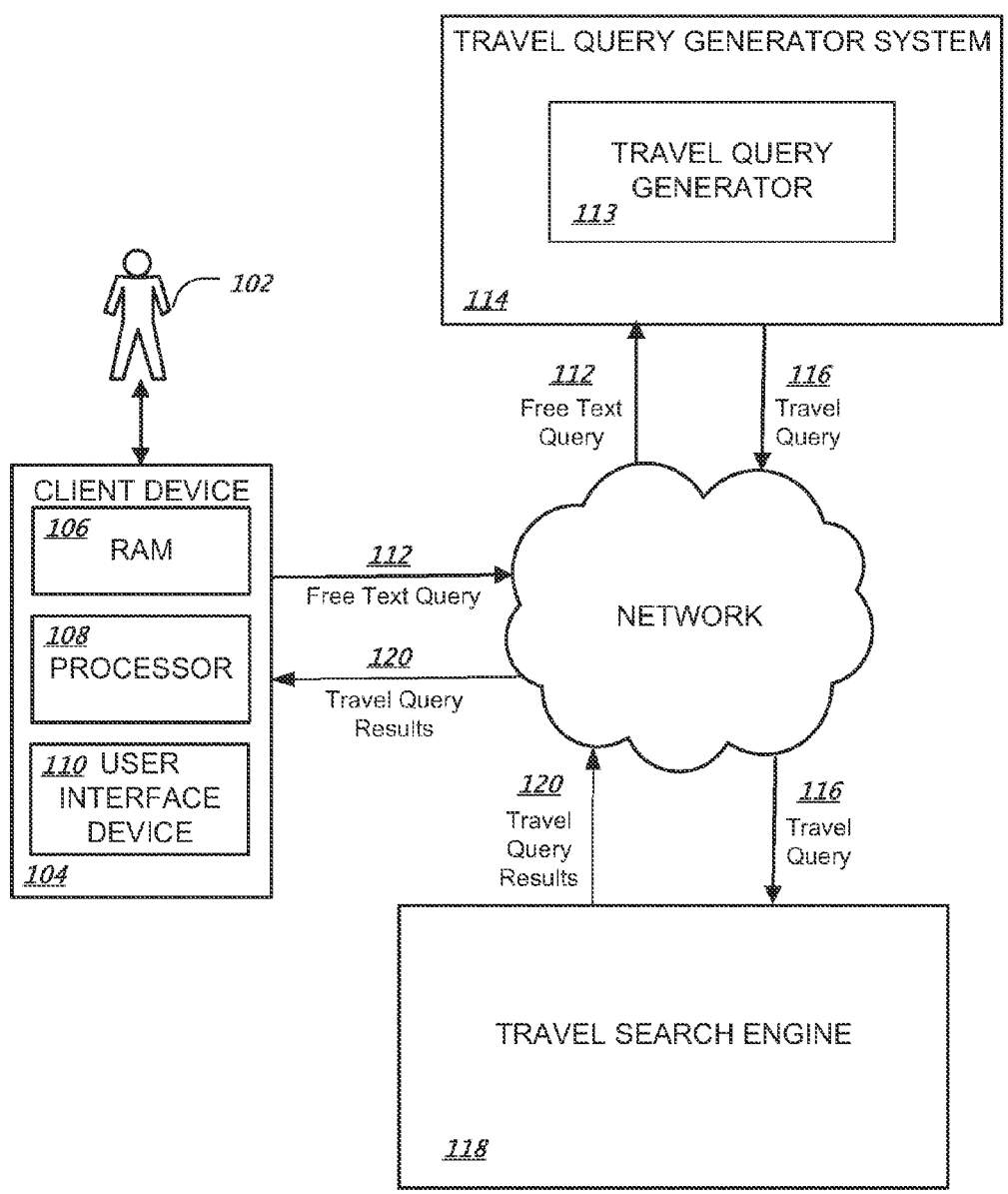
FIG. 1 illustrates an example travel query generator system.

FIG. 1 illustrates an example travel query generator system 114 as can be implemented for use in an Internet, an intranet, or another client and server environment. The travel query generator system 114 will generally include a travel query generator 113, as described in more detail below with reference to FIG. 3. The travel query generator system 114 generates travel queries from free text queries. The travel queries are then submitted to a travel search engine 118. The systems, components, and techniques described below can be implemented in the example travel query generator system.

A user 102 can interact with the travel query generator system 114 through a client device 104. In some implementations, the client device 104 can communicate with the travel query generator system 114 over a network. For example, the client device 104 can be a computer coupled to the travel query generator system 114 through one or more wired or wireless networks, e.g., mobile phone networks, local area networks (LANs) or wide area networks (WANs), e.g., the Internet. In some implementations, the client device 104 can communicate directly with the travel query generator system 114. For example, the travel query generator system and the client device 104 can be implemented on one machine. For example, a user can install a desktop travel query generator system application on the client device 104. The client device 104 will generally include a random access memory (RAM) 106, a processor 108, and one or more user interface devices 110, e.g., a display or a speaker for output, and a keyboard, mouse, microphone, or touch sensitive display for input.

A user 102 can use the client device 104 to submit a free text query 112 to the travel query generator system 114. For example, the user can use the one or more user interface devices 110 of the client device 104 to enter the free text query 112 in a user interface provided by the travel query generator system 114, e.g., in a single query text input field of a web page. The free text query 114 is text in natural language form, e.g., the language the user naturally writes or speaks in. A free text query is a query that may or may not expressly state specific travel constraints. When not expressly stated in the free text query, the system infers the necessary constraints from the free text query as described below. An example free text query that does expressly state some specific travel constraints would be, for example, "depart Los Angeles on August 12 and return from San Francisco on August 19." An example free text query that does not expressly state any specific travel constraints would be, for example, "vacations to Europe in summer."

The travel query generator system 114 can be implemented as, for example, computer programs running on one or more computers in one or more locations that are coupled to each other through a network. The travel query generator system 114 responds to the free text query 112 by generating a travel query 116. The travel query 116 is generated from the free text query 112 as described in more detail below with reference to FIG. 2. The travel query 116 specifies an origin location, a destination location, and a departure date. The origin location defines a geographical location for travel to originate. For example, the origin location can be any city from which travel can originate. The destination location defines a geographical location that is to be travelled to. For example, the destination location can be any city that can be travelled to. The departure date defines a date of departure or a range of departure dates from the origin location. Additionally, the travel query 116 can also specify a duration of stay or return date. The return date defines a date of departure from the destination location. The travel query 116 is transmitted to a travel search engine 118 through the network.

In some implementations, the user 102 can submit the free text query 112 to a search engine over a network. The free text query 112 can be submitted to a general user interface provided by the search engine, e.g., a web page with a query text input field. The search engine determines that the input is likely a travel query and transmits the free text query 112 to the travel query generator system 114 in addition to the other processing the search engine generally performs on query inputs. In alternative implementations, the free text query 112 is always transmitted to the travel query generator system 114. The travel query generator system 114 derives an origin location, a destination location, a departure date, and a return date to generate the travel query 116. The origin location, destination location, departure date, and return date are each assigned a probability value, as described in more detail below with reference to FIGS. 4-7. The probability values are combined according to a combination function; for example, the values can be added or multiplied together. If the combined value does not satisfy a threshold value, then the search engine generates search results that satisfy the free text query 112 without using the travel search engine 118 and provides the search results to the user 102. If the combined value does satisfy the threshold value, then the travel query 116 is transmitted to the travel search engine 118.

The travel search engine 118 responds to the received travel query 116 by obtaining travel query results 120 that are responsive to the travel query 116. A travel query result represents a travel option, e.g., a travel itinerary including departure date, departure flight, return date, return flight, that satisfies the travel constraints inferred from the free text query. The travel query results 120 are transmitted through a network to the user device 104 and presented in an organized fashion to the user 102, e.g., a travel search engine results web page displayed in a web browser running on the client device 104. Other search results generated by the search engine can be optionally presented with the travel query results 120. Each travel query result can include a description of the represented travel option and a hyperlink to a site that allows the user to book the different components of the travel option. In some implementations, the travel query results 120 are transmitted through the network back to the travel query generator system 114. In response to receiving the travel query results 120, travel query generator system 114 can transmit travel query results 120 through the network to client device 104 for presentation to user 102.

Figure 2:
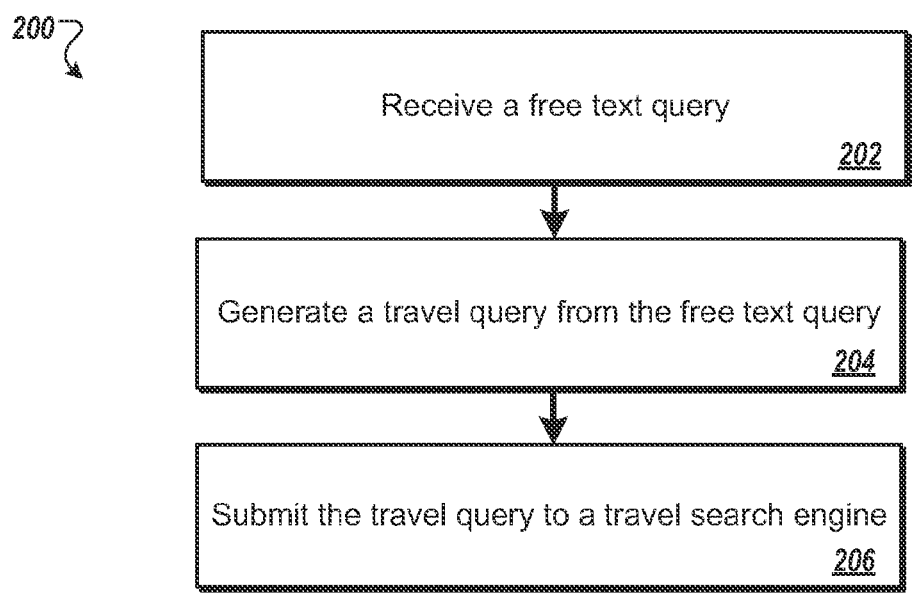
FIG. 2 illustrates an example method for generating travel queries from free text queries.

FIG. 2 illustrates an example method for generating travel queries from free text queries. For convenience, the example method 200 will be described with reference to a system that performs the method 200. The system can be, for example, the travel query generator system 114 described above with reference to FIG. 1.

The system receives a free text query (202).

The system generates a travel query from the free text query (204). From the free text query, the system derives an origin location, a destination location, and a departure date. The travel query is then generated from the derived information so that the travel query expressly specifies the origin location, the destination location, and the departure date; that is, each of the origin location, the destination location, and the departure date are expressly identified as such in the travel query.

In some implementations, the system also derives a duration of stay or return date from the free text query. The generated travel query can include the duration of stay or return date; that is the duration of stay or return date is expressly identified as such in the generated travel query.

In some implementations, the system further obtains user information and popular-travel information, in addition to the received free text query. The user information can be specific for a user associated with the free text query. The popular-travel information can identify travel constraints that are commonly submitted to travel search engines by a population of users. The popularity level for a particular travel constraint can represent the number of travel queries that are submitted to travel search engines with the particular travel constraint. In other implementations, the popular-travel information is identified from common travel itineraries of the population of users. In some implementations, each of the users of the population of users share one or more characteristics with the user associated with the free text query. From the free text query, the user information, and the popular-travel information, the system can derive an origin location, destination location, departure date, and return date as described in more detail below with reference to FIGS. 4-7. The system then generates the travel query from the travel constraints derived from the free text query, user information, and the popular-travel information.

The system submits the travel query to a travel search engine (206), for example, as described above with reference to FIG. 1.

Figure 3:
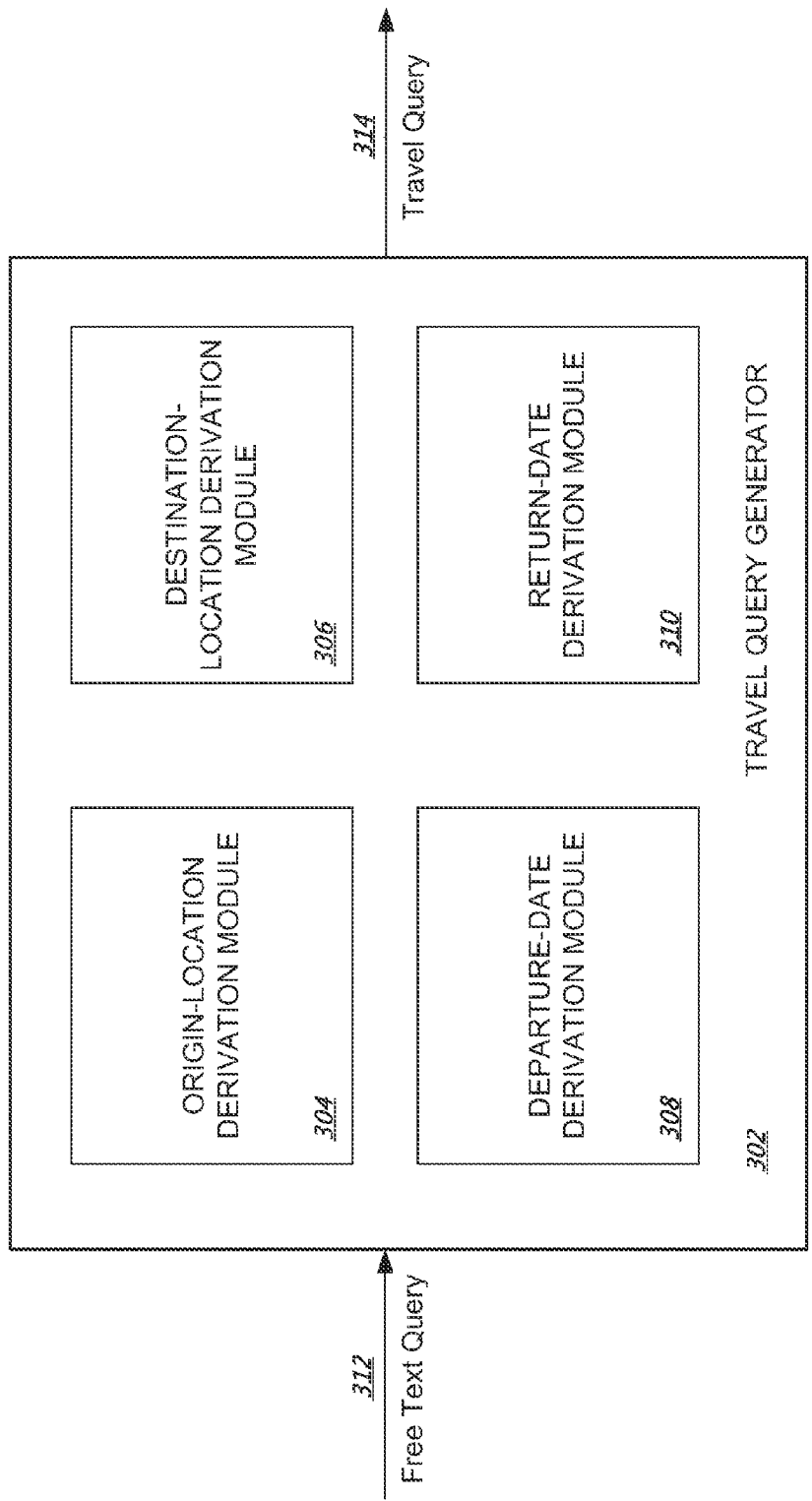
FIG. 3 illustrates an example travel query generator.

FIG. 3 illustrates an example travel query generator 302. The travel query generator 302 is an example of the travel query generator 113 described above with reference to FIG. 1.

The travel query generator 302 includes an origin-location derivation module 304, a destination-location derivation module 306, a departure-date derivation module 308, and a return-date derivation module 310. The travel query generator 302 receives a free text query 312 and generates a travel query 314 from the free text query 312.

The origin-location derivation module 304 receives the free text query 312 and derives an origin location from the free text query 312 and other information, as described in more detail below with reference to FIG. 4.

The destination-location derivation module 306 receives the free text query 312 and derives a destination location from the free text query 312 and other information, as described in more detail below with reference to FIG. 5.

The departure-date derivation module 308 receives the free text query 312 and derives a departure date, or a range of departure dates, from the free text query 312 and other information, as described in more detail below with reference to FIG. 6.

The return-date derivation module 310 receives the free text query 312 and derives a return date from the free text query 312 and other information, as described in more detail below with reference to FIG. 7.

Travel query generator 302 generates travel query 314 from the derived origin location, destination location, departure date, and return date, as described in more detail below with reference to FIG. 8.

Figure 4:
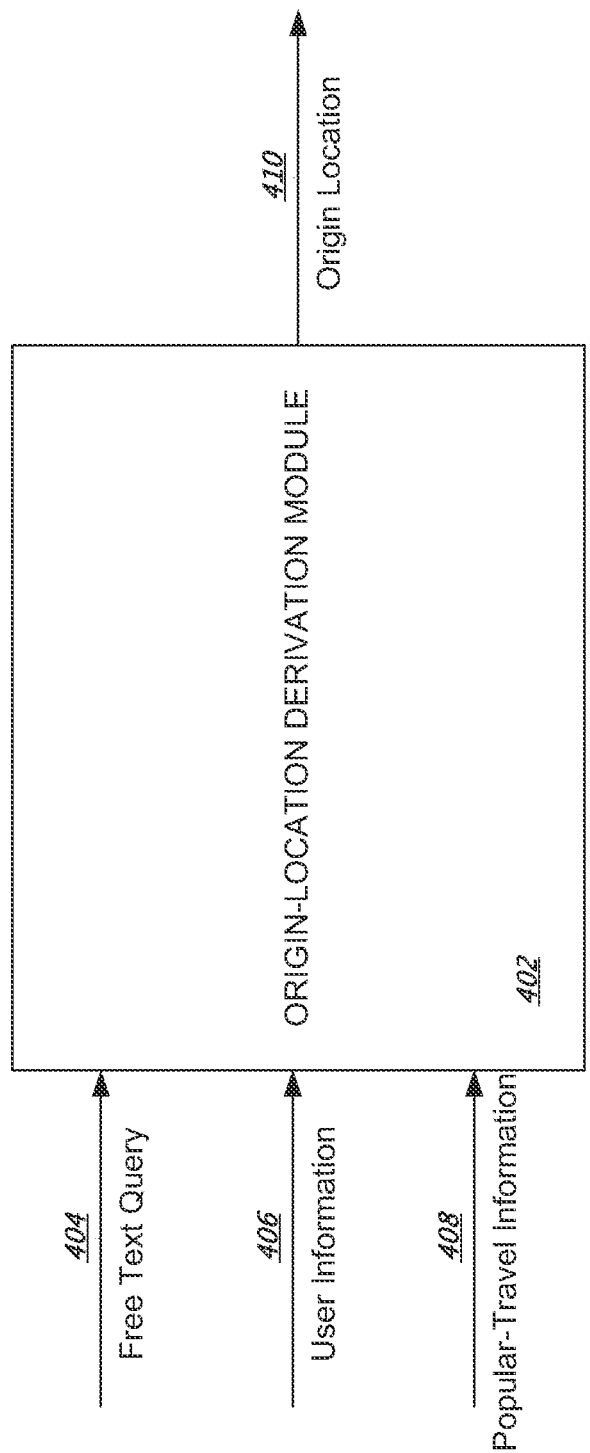
FIG. 4 illustrates an example origin-location derivation module.

FIG. 4 illustrates an example origin-location derivation module 402. The example origin-location derivation module 402 is an example of the origin-location derivation module 304 described above with reference to FIG. 3.

The origin-location derivation module 402 receives a free text query 404. The free text query 404 can be received from a user. The origin-location derivation module 402 also obtains user information 406 specific to the user and popular-travel information 408. The origin-location derivation module 402 derives origin location 410 from a combination of the free text query 404, user information 406, and popular-travel information 408. The origin location 410 is then used to generate the travel query by the travel query generator.

The user information 406 provides additional information to assist the origin-location derivation module 402 derive the origin location 410. The user information 406 can identify a geographic location of the user. For example, if origin-location derivation module 402 receives free text query "summer vacation in Europe," origin-location derivation module 402 can derive an origin location 410 that is within a predetermined distance from the geographic location of the user. Additionally, or alternatively, the user information 406 can include past user origin locations. The past user origin locations identify geographic locations from which the user previously originated travel, e.g., cities with airports. For example, the user information 406 can identify that the user has previously flown to destinations in Europe from Los Angeles. In response to the free text query "summer vacations in Europe," the origin-location derivation module 402 can derive Los Angeles as the origin location. Additionally, or alternatively, the user information 406 can describe past user cost for travel that originated from the user's different past origin locations. For example, the user information 406 can describes the costs incurred by the user for flights the user took from Los Angeles and San Diego to destinations in Europe. Origin-location derivation module 402 can derive the origin location by selecting the past origin location with the lowest past user cost. Alternatively, a past origin location can be selected as the origin location if its associated past travel cost is below a predetermined threshold.

The popular-travel information 408 provides additional information to assist the origin-location derivation module 402 derive the origin location 410. The popular-travel information 408 can identify popular origin locations. The popular origin locations are selected from all possible geographic locations. In some implementations, the popular origin location is selected from geographic locations that are within a predetermined maximum distance from the geographic location of the user. The distance can be measured in terms of the time of travel, the cost of travel, or distance of travel from the user's geographic location. For example, the popular-travel information can indicate that Los Angeles and San Francisco are popular origin locations. The predetermined maximum distance can be 150 miles. If the user were located in San Diego, San Francisco would be outside the 150-mile maximum distance from the user. Therefore, the origin-location derivation module 402 can derive Los Angeles as the origin location 410 instead of San Francisco. In some implementations, the popular-travel information 408 can identify popular origin locations that are specific for a particular destination location. For example, the popular-travel information can indicate that Los Angeles is a popular origin location for travel to Europe, whereas Burbank is a popular origin location for travel Mexico. In response to a free text query "summer vacations in Europe," the origin-location derivation module 402 can derive Los Angeles as the origin location because it is a popular origin for travel to Europe. Additionally, or alternatively, the popular-travel information can also describe estimated costs for travel that originates from the different popular origin locations. For example, the user information 406 can describe estimated costs for flights from Los Angeles and San Diego to destinations in Europe. Origin-location derivation module 402 can derive the origin location by selecting the popular origin location with the lowest estimated travel cost in response to the free text query "summer vacations in Europe." Alternatively, a popular origin location can be selected as the origin location if its estimated travel cost is below a predetermined threshold.

The origin-location derivation module 402 parses the free text query to identify candidate origin locations from the free text query. For example, from the free text query "summer vacation from Los Angeles to Europe," "Los Angeles" is identified as a candidate origin location.

In some implementations, an algorithm is used by origin-location derivation module 402 to derive the origin location. For example, the algorithm can be a probability function that determines a probability for each of the candidate origin locations. The probability for a particular candidate origin location represents a certainty that a travel query submitted to the travel search engine for the user should be defined by the particular origin location constraint. The candidate origin locations include candidate origin locations parsed from the free text query, popular origin locations, and past user origin locations. Candidate origin locations that parsed from the free text query are assigned high probability values by the probability function. Additionally, or alternatively, the probability function determines probabilities for the candidate origin locations from the obtained user information 406 and popular-travel information 410. For example, the probability function can determine the probability value for a candidate origin location from the popularity level of the origin location and the number of times the user has travelled from the origin location. The probability of a candidate origin location can be additionally weighted by the proximity of the candidate origin location to the user and the estimated travel costs or past user travel costs for travel that originates from the candidate origin location. For example, if the candidate origin location is "Los Angeles," the number of travel searches that specify "Los Angeles" as the origin location and the distance between Los Angeles and a geographical location of the user can be input into the probability function. The probability function can also take into account the estimated travel cost for travel that originates from Los Angeles. Based on the inputted information, the probability function outputs a probability value for "Los Angeles" as an origin location.

In some implementations, the origin-location derivation module 402 derives a single origin location from the candidate origin locations. For example, the origin-location derivation module 402 derives the candidate origin location with the greatest probability as the origin location. In other implementations, the origin-location derivation module 402 derives more than one origin location from the candidate origin locations. For example, the origin-location derivation module 402 derives the n candidate origin locations with the greatest probabilities as origin locations, where n is an integer.

Figure 5:
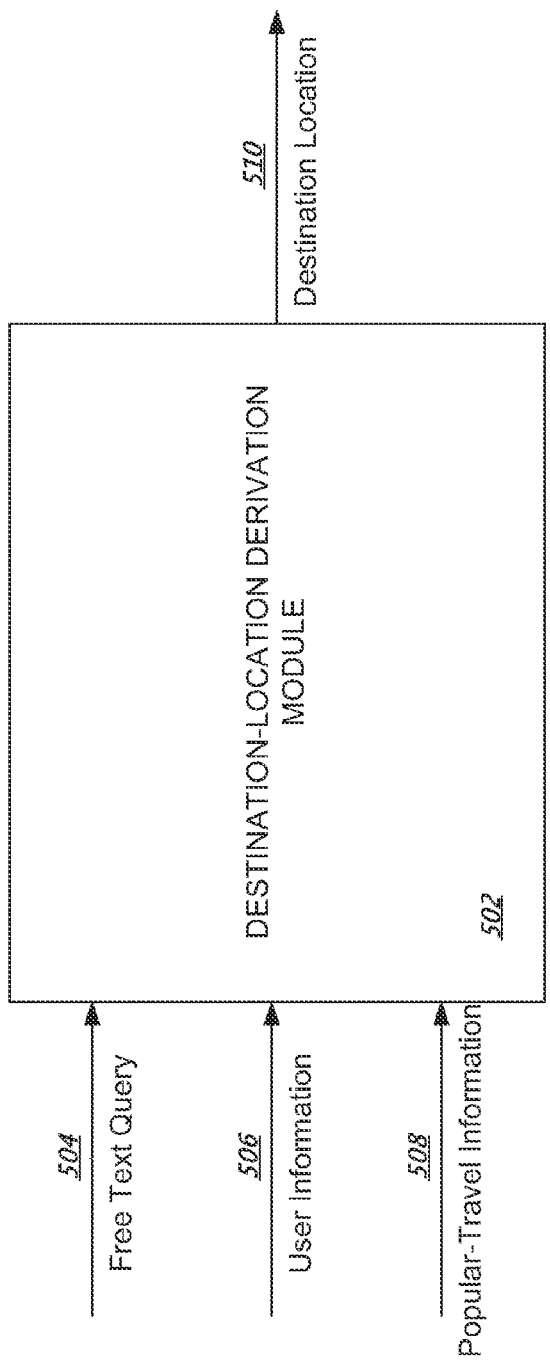
FIG. 5 illustrates an example destination-location derivation module.

FIG. 5 illustrates an example destination-location derivation module 502. The example origin-location derivation module 502 is an example of the destination-location derivation module 306 described above with reference to FIG. 3.

The destination-location derivation module 502 receives a free text query 504. The free text query 504 can be received from a user. The destination-location derivation module 502 also obtains user information 506 specific to the user and popular-travel information 508. The destination-location derivation module 502 derives destination location 510 from a combination of the free text query 504, user information 506, and popular-travel information 508. The destination location 510 is then used to generate the travel query by the travel query generator.

The user information 506 provides additional information to assist the destination-location derivation module 502 derive the destination location 510. The user information 506 can identify past user destination locations. The past user destination locations identify geographic locations that the user has travelled to in the past, e.g., cities with airports. For example, the user information 506 can identify that the user has previously flown to Paris, France, Hamburg, Germany and Tokyo, Japan. In response to the free text query "summer vacations in Europe," the destination-location derivation module 502 can derive a destination location 510 based on the user's past destination locations that are geographically located in Europe. The destination location 510 can be a geographical location in Europe that the user has traveled to in the past, e.g., Paris or Hamburg, or a location that the user has not traveled to in the past, e.g., London. Additionally, or alternatively, the user information 506 can describe past user cost for travel to the past user destinations. For example, the user information 506 can describe the costs incurred by the user for flights the user took to Paris and Hamburg. Destination-location derivation module 502 can derive the destination location 510 by selecting the past destination location with the lowest past user cost. Alternatively, a past destination location can be selected as the destination location if its associated past travel cost is below a predetermined threshold.

Additionally, or alternatively, the user information 506 can identify past user destination types. Past user destination types are particular types of locations that the user has travelled to in the past. The past destination types can include beach destinations, skiing destinations, mountain destinations, national park destinations, or romantic destinations. Other types of destination types can exist. For example, if the user has travelled to Honolulu, Hi., the destination-location derivation module 502 can identify beach destinations as a past user destination type. In some implementations, past destination locations can be categorized as a combination of destination types. For example, Honolulu, Hi. can be identified as both a beach destination and a romantic destination. The destination-location derivation module 502 can specify a destination location 510 that is a destination type that is the same or different from past user destination types. For example, if destination-location derivation module 502 receives free text query "summer vacations in Europe," the destination-location derivation module 502 can derive a destination location 510 based on the user's past beach destination type. The destination-location derivation module 502 can identify geographic locations that are known beach destinations in Europe to be specified as the destination location in the travel query, or alternatively, the system can identify non-beach geographic locations in Europe as the destination location.

Additionally, or alternatively, weather conditions at the past user destination locations can be obtained by the destination-location derivation module 502. The weather conditions can be obtained from online weather websites. Weather conditions for a range of dates for each of the past user destination locations can be obtained. This information can assist the destination-location derivation module 502 avoid deriving a destination location 510 with inclement weather conditions for the planned travel dates. For example, the destination-location derivation module 502 can derive past user destination locations as the destination location 510 if the past user destination locations satisfy certain predetermined weather parameters, e.g., temperature, wind conditions, humidity, chance of precipitation.

Additionally, or alternatively, the user information 506 can additionally identify information about the user's contacts. The destination-location derivation module 502 can obtain this information from one or more social networks that the user belongs to. The contact information can include contact names and a geographic location associated with each of the contacts. The destination-location derivation module 502 can derive destination location 510 based on the location of the user's contacts.

The popular-travel information 508 provides additional information to assist the destination-location derivation module 502 derive the destination location 510. The popular-travel information 508 can identify popular destination locations. The popular destination locations are selected from geographic locations outside a predetermined minimum distance from the geographic location of the user. The distance can be measured in terms of the time of travel, the cost of travel, or distance of travel from the user's geographic location. For example, the popular-travel information can indicate that Rome and Los Angeles are popular destination locations. The predetermined minimum distance can be 150 miles. If the user were located in San Diego, Los Angeles would not be outside the 150-mile minimum distance from the user. Therefore, the destination-location derivation module 502 can derive Rome as the destination location 510 instead of Los Angeles. Additionally, or alternatively, the popular travel information 508 can also describe estimated cost for travel to the popular destination locations. For example, the user information 506 can describe estimated costs for flights to Rome and Los Angeles. Destination-location derivation module 502 can derive the destination location by the selecting the popular destination location with the lowest estimated travel cost. Alternatively, a popular destination location can be selected as the destination location 510 if its estimated travel cost is below a predetermined threshold.

Alternatively, or additionally, the popular-travel information 508 can identify popular destination types. Popular destination types are particular types of locations that are popular with a population of users. The popular destination types can include beach destinations, skiing destinations, mountain destinations, national park destinations, or romantic destinations. Other types of destination types can exist. For example, if Honolulu, Hi. is a popular destination location, as indicated by travel queries from the population of users, the destination-location derivation module 502 can identify beach destinations as a popular destination type. In some implementations, popular destination locations can be categorized as a combination of destination types as described above. The destination-location derivation module 502 can derive a destination location 510 that is the same destination type as the popular destination types. For example, if destination-location derivation module 502 receives free text query "summer vacations in Europe," the destination-location derivation module 502 can derive a destination location in Europe that is categorized as a beach destination, e.g., Ibiza.

Additionally, or alternatively, weather conditions at the popular destination locations can be obtained by the destination-location derivation module 502. The system can obtain the weather information from online weather websites. Weather conditions for a range of dates for each of the popular destination locations can be obtained. This information can assist the destination-location derivation module 502 avoid deriving a destination location 510 with inclement weather conditions for the planned travel dates. For example, the destination-location derivation module 502 can derive popular destination locations as the destination location 510 if the popular destination locations satisfy certain predetermined weather parameters, e.g., temperature, wind conditions, humidity, chance of precipitation.

Additionally, or alternatively, the popular travel-information 508 can additionally identify information about events. The destination-location derivation module 502 can obtain this information from online databases of events, e.g., Ticketmaster. Information obtain for a given event can include event details describing the name of the event, location of the event, type of event, cost of the event, and date of the event. The destination-location derivation module 502 can derive destination location 510 based on the location of the events.

The destination-location derivation module 502 parses the free text query to identify candidate destination locations from the free text query. For example, from the free text query "summer vacations in Paris," "Paris" is identified as a candidate destination location.

In some implementations, an algorithm is used by destination-location derivation module 502 to derive the destination location. For example, the algorithm can be a probability function that determines a probability for each of the candidate destination locations. The probability for a particular candidate destination location represents a certainty that a travel query submitted to the travel search engine for the user should be defined by the particular destination location constraint. The candidate destination locations include candidate destination locations parsed from the free text query, popular destination locations, past user destination locations, user contact locations, and event locations. Candidate destination locations parsed from the free text query are assigned high probability values by the probability function Additionally, or alternatively, the probability function determines probabilities for the candidate destination locations from the obtained user information 506 and popular-travel information 510. For example, the probability function can determine the probability value for a candidate destination location from the popularity level of the destination location and the number of times the user has travelled to the destination location. The probability of the candidate destination location can be additionally weighted based on the estimated travel costs or past user travel costs for travel to the candidate destination location, the weather conditions at the candidate destination location, and whether the candidate destination location is a destination type that is popular or frequented by the user. For example, if Paris is a candidate destination location, the number of travel queries that specify "Paris" as the destination location, the estimated travel cost for a flight to Paris, the temperature in Paris, and whether Paris is a popular destination type can be input into the probability function. Based on the inputted information, the probability function outputs a probability value for "Paris" as a destination location.

In some implementations, the destination-location derivation module 502 derives a single destination location from the candidate destination locations. For example, the destination-location derivation module 502 derives the candidate destination location with the greatest probability as the destination location. In other implementations, the destination-location derivation module 502 derives more than one destination location from the candidate destination locations. For example, the destination-location derivation module 502 derives the n candidate destination locations with the greatest probabilities as destination locations, where n is an integer.

Figure 6:
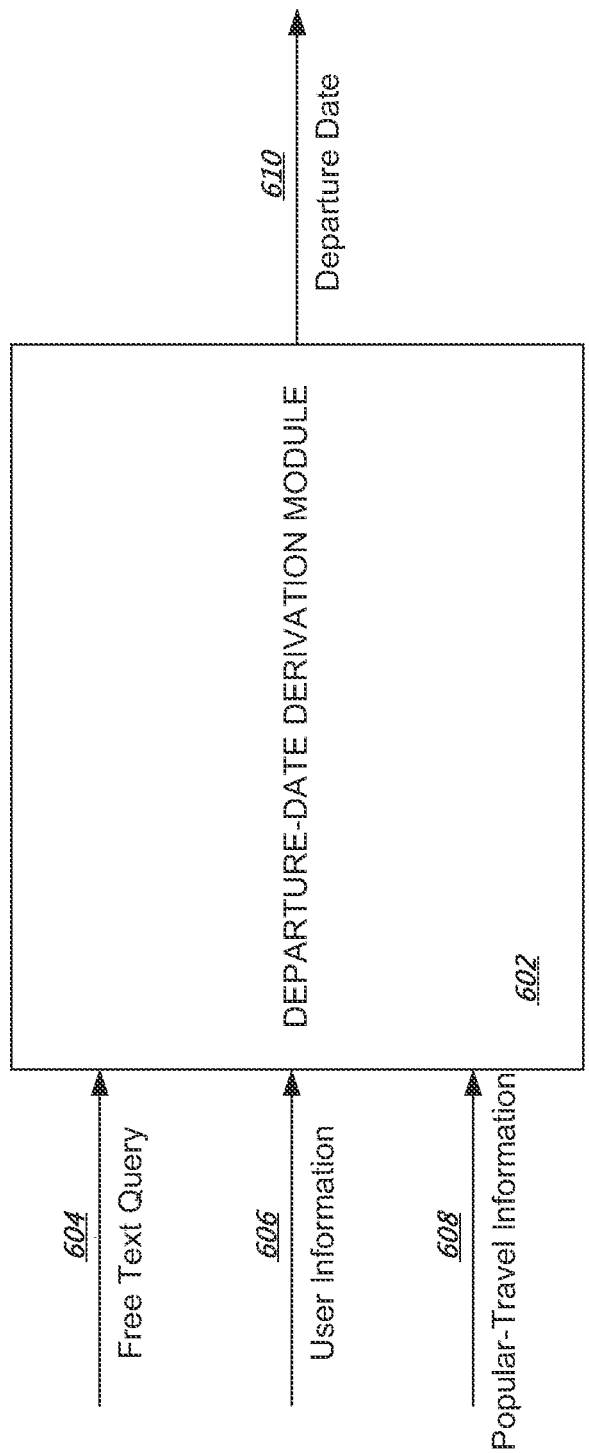
FIG. 6 illustrates an example departure-date derivation module.

FIG. 6 illustrates an example departure-date derivation module 602. The example departure-date derivation module 602 is an example of the departure-date derivation module 308 described above with reference to FIG. 3.

The departure-date derivation module 602 receives free text query 604 from a user. The departure-date derivation module 602 also obtains user information 606 specific to the user and popular-travel information 608. The departure-date derivation module 602 derives departure date 610 from a combination of the free text query 604, user information 606, and popular-travel information 608. The departure date 610 is then used to generate the travel query by the travel query generator.

The user information 606 provides additional information to assist the departure-date derivation module 602 derive the departure date 610. The user information 606 can identify past user departure dates. The past user departure dates are dates where the user has departed from origin locations in past travel. For example, if departure-date derivation module 602 receives free text query 604 "summer vacations in Europe," departure-date derivation module 602 can derive a departure date 610 based on the user's past summer departure dates. The derived departure date 610 can be a date that is the same date or near the same date as the past user departure dates. The user information 606 can also identify the number of times that the user has departed on a particular departure date. Departure dates that the user has frequently departed on can be given greater weight than departure dates that the user has infrequently departed on when deriving departure date 610.

The popular-travel information 608 provides additional information to assist the departure-date derivation module 602 derive the departure date 610. The popular-travel information 608 can identify popular departure dates. The popular departure dates are dates that are popular among a population of users to depart from origin locations. For example, if departure-date derivation module 602 receives free text query 604 "summer vacations in Europe," departure-date derivation module 602 can derive a departure date 610 based on popular summer departure dates. The popular-travel information 608 can additionally identify how popular a departure date is, based on the number of users in the population of users. Departure dates that are more popular can be given greater weight than departure dates that are less popular when deriving departure date 610.

The departure-date derivation module 602 parses the free text query to identify candidate departure dates from the free text query. For example, from the free text query "August 1 summer vacations in Paris," "August 1" is identified as a candidate departure date. In some implementations, multiple candidate departure dates can be parsed from the free text query. For example, from the free text query "summer vacation in Paris departing August 1-15," every date between July $31^{st}$ and August $16^{th}$ can be determined to be a candidate departure date. Additionally, the departure-date derivation module 602 can identify candidate departure dates from terms in the free text query that are associated with dates. The identified candidate departure dates can be the dates that are associated with the terms. For example, from the free text query, "Thanksgiving flight to Los Angeles," the departure-date derivation module 602 can identify the date of Thanksgiving as a candidate departure date. As a further example, from the free text query, "flight to Los Angeles next Friday," the departure-date derivation module 602 can identify the date represented by next Friday as a candidate departure date.

In some implementations, an algorithm is used by departure-date derivation module 602 to derive the departure date. For example, the algorithm can be a probability function that determines a probability for each of the candidate departure dates. The probability for a particular candidate departure date represents a certainty that a travel query submitted to the travel search engine for the user should be defined by the particular departure date constraint. The candidate departure dates include candidate departure dates parsed from the free text query, popular departure dates, and past user departure dates. Candidate departure dates that are parsed from the free text query are assigned high probability values by the probability function. Additionally, or alternatively, the probability function determines probabilities for the candidate departure dates from the obtained user information 606 and popular-travel information 610. For example, the probability function can determine the probability value for a candidate departure date from the popularity of the departure date and the number of times the user has departed on or around the departure date. A candidate departure date that is more popular and frequently near the user's historical travel departure dates will be assigned a greater probability score than a candidate departure date that is not popular and not around when the user historically travels.

In some implementations, the departure-date derivation module 602 derives a single departure date from the candidate departure dates. For example, the departure-date derivation module 602 derives the candidate departure date with the greatest probability as the departure date. In other implementations, the departure-date derivation module 602 derives more than one departure date from the candidate departure dates. For example, the departure-date derivation module 602 derives the n candidate departure dates with the greatest probabilities as departure dates, where n is an integer.

Figure 7:
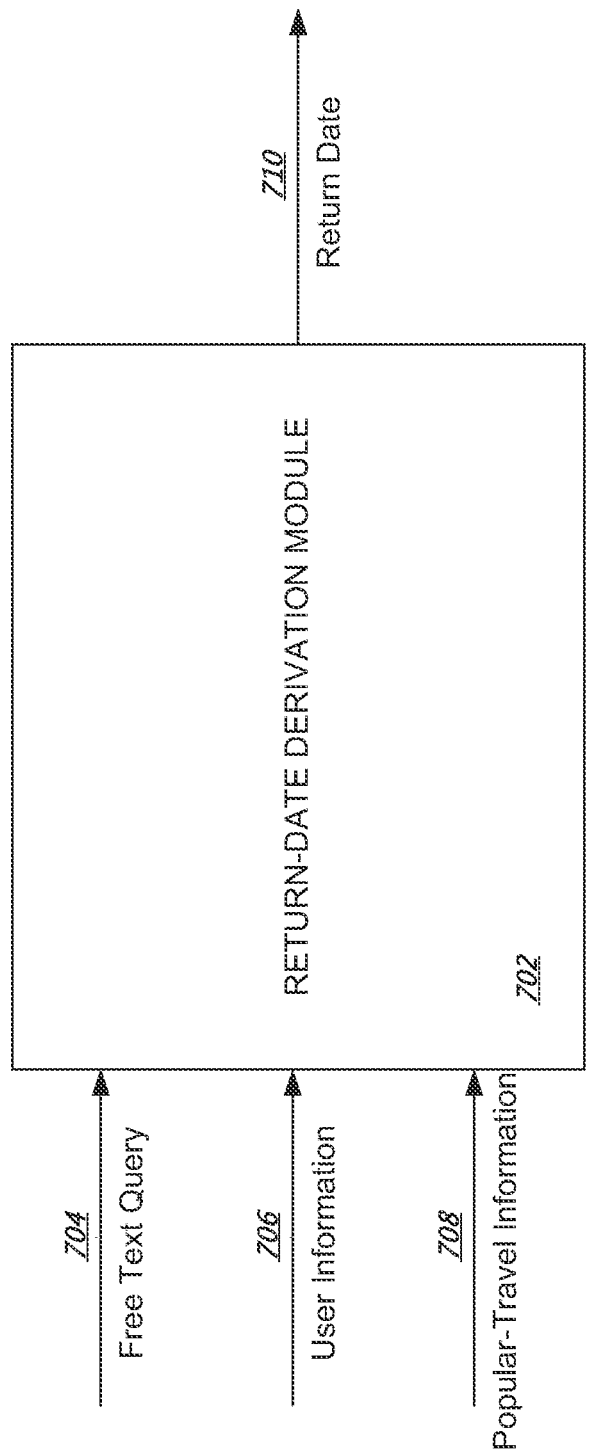
FIG. 7 illustrates an example return-date derivation module.

FIG. 7 illustrates an example return-date derivation module 702. The example return-date derivation module 702 is an example of the return-date derivation module 310 described above with reference to FIG. 3.

The return-date derivation module 702 receives free text query 704 from a user. The return-date derivation module 702 also obtains user information 706 specific to the user and popular-travel information 708 as described above in reference to FIG. 2. The return-date derivation module 702 derives return date 710 from a combination of the free text query 704, user information 706, and popular-travel information 708. The return date 710 is then used to generate the travel query by the travel query generator.

The user information 706 provides additional information to assist the return-date derivation module 702 derive the return date 710. The user information 706 can identify past user return dates. The past user return dates are dates where the user has returned from destination locations in past travel. For example, if return-date derivation module 702 receives free text query 604 "summer vacations in Europe," return-date derivation module 702 can derive a return date 710 based on the user's past summer return dates. The derived return date 710 can be a date that is the same date or near the same date as the past user return dates. The user information 706 can also identify the number of times that the user has returned on a particular return date. Return dates that the user has frequently returned on can be given greater weight than return dates that the user has infrequently returned on when deriving return date 710.

The popular-travel information 708 provides additional information to assist the return-date derivation module 702 derive the return date 710. The popular-travel information 708 can identify popular return dates and popular length of stays for particular destination locations or time periods. The popular return dates are dates that are popular among a population of users to return from destination locations. For example, if return-date derivation module 702 receives free text query 704 "summer vacations in Europe," return-date derivation module 702 can derive a return date 710 based on popular summer return dates or popular lengths of stay in summer for the destination location. The popular-travel information 708 can additionally identify how popular a return date is, based on the number of users in the population of users. Return dates that are more popular can be given greater weight than return dates that are less popular when deriving return date 710.

The return-date derivation module 702 parses the free text query to identify candidate return dates from the free text query. For example, from the free text query "summer vacations in Paris returning August 1," "August 1" is identified as a candidate return date. In some implementations, multiple candidate return dates can be parsed from the free text query. For example, from the free text query "summer vacation in Paris returning August 1-15," every date between July $31^{st}$ and August $16^{th}$ can be determined to be a candidate return date. Additionally, the return-date derivation module 702 can identify candidate return dates from terms in the free text query that are associated with dates. The identified candidate return dates can be the dates that are associated with the terms. For example, from the free text query, "vacation to Los Angeles returning Thanksgiving," the return-date derivation module 702 can identify the date of Thanksgiving as a candidate return date. As a further example, from the free text query, "vacation to Los Angeles returning next Friday," the return-date derivation module 602 can identify the date represented by next Friday as a candidate return date.

In some implementations, an algorithm is used by return-date derivation module 702 to derive the return date. For example, the algorithm can be a probability function that determines a probability for each of the candidate return dates. The probability for a particular candidate return date represents a certainty that a travel query submitted to the travel search engine for the user should be defined by the particular return date constraint. The candidate return dates include candidate return dates parsed from the free text query, popular return dates, and past user return dates. Candidate return dates that are parsed from the free text query are assigned high probability values by the probability function. Additionally, or alternatively, the probability function determines probabilities for the candidate return dates from the obtained user information 706 and popular-travel information 710. For example, the probability function can determine the probability value for a candidate return date from the popularity of the return date and the number of times the user has returned on or around the return date. A candidate return date that is more popular and frequently near the user's historical travel return dates will be assigned a greater probability score than a candidate return date that is not popular and not around when the user historically travels. In some implementations, the return-date derivation module 702 derives a single return date from the candidate return dates. For example, the return-date derivation module 702 derives the candidate return date with the greatest probability as the return date. In other implementations, the return-date derivation module 702 derives more than one return date from the candidate return dates. For example, the return-date derivation module 702 derives the n candidate return dates with the greatest probabilities as return dates, where n is an integer.

In some implementations, the return-date derivation module 702 determines a length of stay at the destination location. For example, in response to the free text query "Paris on August 17 for a week," the free text query can be parsed to determine that the length of stay is one week, or seven days. The return-date derivation module then derives the return date by adding the length of stay to the departure date derived by the departure-date derivation module. For example, the seven-day length of stay is added to August 17 to derive a return date of August 24.

Figure 8:
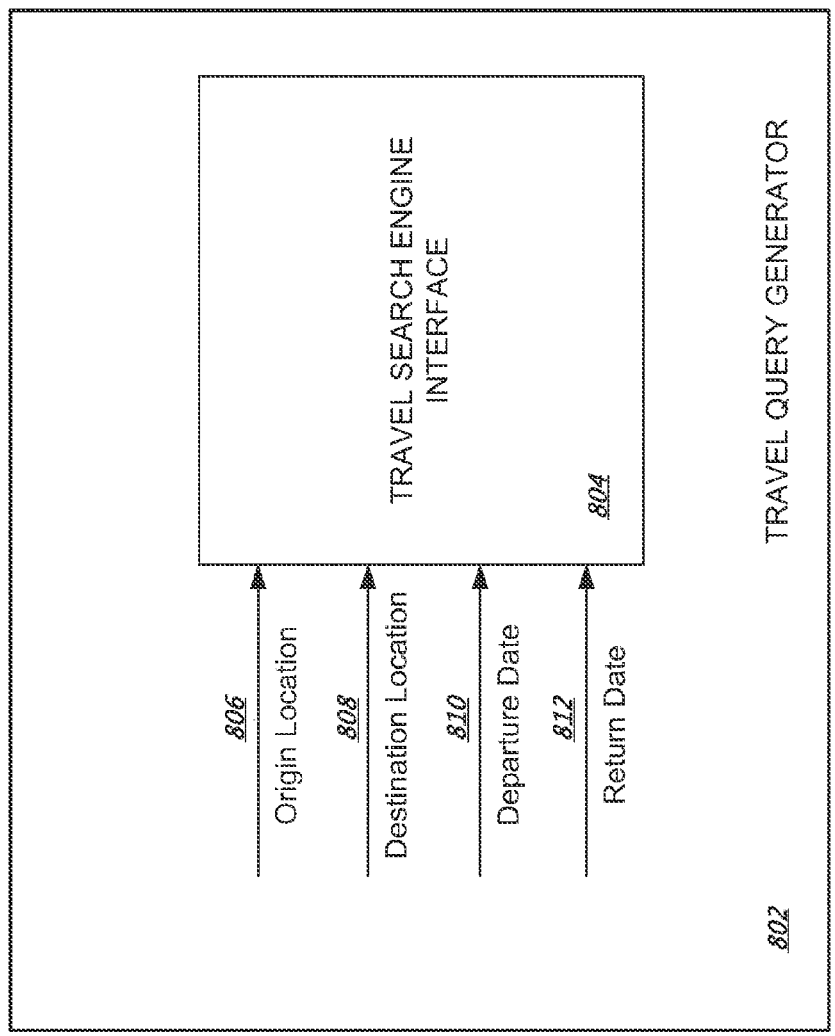
FIG. 8 illustrates an example travel search engine interface.

FIG. 8 illustrates an example travel search engine interface 804. The example travel search engine interface 804 is a component within travel query generator 802 described above with reference to FIG. 3.

The travel search engine interface 804 receives origin location 806, destination location 808, departure date 810, and return date 812. From origin location 806, destination location 808, departure date 810, and return date 812, the travel search engine interface 804 generates a travel query and transmits the travel query to a travel search engine.

In some implementations, the travel search engine interface 804 concatenates text describing the origin location 806, destination location 808, departure date 810, and return date 812. The travel query can be the text string that results from the concatenation. In some implementations, the travel query expressly identifies the different travel parameters in the travel query. For example, "San Francisco" can be identified as a destination location in the travel query. The text string is transmitted to a travel search engine.

In some implementations, multiple travel queries can be generated from a free text query. More than one travel constraint can be derived by each of the modules in the travel query generator. For example, the origin-location derivation module can derive more than one origin-location from the free text query. As a further example, the departure-date derivation module can additionally derive a number of departure-dates from the free text query. The travel search engine interface 804 can therefore receive more than one of each origin location, destination location, departure date, and return date. The travel search engine interface 804 can generate multiple travel queries by concatenating different combinations of the received travel constraints.

The travel search engine interface 804 can communicate directly with the travel search engine by any programmable means. For example, the travel search engine interface 804 can transmit the travel query to the travel search engine by means of an application programming interface (API) implemented or supported by the travel search engine. Alternatively, travel search engine interface 804 can communicate with the travel search engine by means of a web interface associated with the travel search engine. A user agent can be utilized to enter the travel query into the web interface.

In some implementations, the travel search engine interface 804 provides a structured user interface in response to the free text query. The structured user interface can contain fields for different travel constraints, e.g., origin location, destination location, departure date, and return date. Each field can be pre-populated with a respective travel constraint received by the travel search engine interface 804. For example, the origin location field can be pre-populated with the origin location that the origin-location derivation module derived from the free text query. A user can modify the travel parameters pre-populated in the fields to create a custom travel query. For example, the user can remove the pre-populated travel parameters and input different travel parameters into the fields. A custom travel query is then generated from the travel parameters in the fields and transmitted to the travel search engine.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system, comprising:
one or more computing devices and one or more storage devices storing instructions that when executed by the one or more computing devices cause the one or more computing devices to perform operations comprising:
receiving an input of a free text query, wherein the free text query is received as an input into a search interface for a general search engine presented on a client computing device;
using the free text query for the general search engine to derive terms corresponding to particular travel constraints including terms corresponding to an origin location, a destination location, and a departure date, each having a respective probability of being related to a query for travel information;
determining whether a combined probability of the terms being related to a query for travel information exceeds a threshold value;
in response to determining that the combined probability of the terms being related to a query for travel information exceeds the threshold value:
generating a travel query from the terms derived from the free text query, wherein the generated travel query expressly specifies the derived origin location, destination location, and departure date as travel constraints, and wherein each of the origin location, the destination location, and the departure date travel constraints are expressly identified as such in the travel query; and
submitting the travel query to a travel search engine distinct from the general search engine to obtain travel search results based on the travel search query and to present the travel search results based on the travel search query via the client computing device; and
in response to the combined probability of the terms being related to a query for travel information not exceeding the threshold value, generating, by the general search engine, search results that satisfy the free text query input into the general search engine without using the travel search engine and presenting via the client computing device the search results that satisfy the free text query input into the general search engine.

2. The system of claim 1, wherein the travel query further expressly specifies a duration of stay or a return date, wherein the duration of stay or the return date is expressly identified as such.

3. The system of claim 1, wherein the system comprises one or more of:
an origin-location derivation module, wherein, when the system comprises the origin-location derivation module, generating the travel query further comprises deriving the origin location by the origin-location derivation module;
a destination-location derivation module, wherein, when the system comprises the destination-location derivation module, generating the travel query further comprises deriving the destination location by the destination-location derivation module; and
a departure-date derivation module, wherein, when the system comprises the departure-date derivation module, generating the travel query further comprises deriving the departure date by the departure-date derivation module.

4. The system of claim 3, wherein the origin-location derivation module, the destination-location module, and the departure-date derivation module are a single module.

5. The system of claim 3, wherein the system comprises the origin-location derivation module and the origin-location derivation module is configured to perform operations comprising:
obtaining user information about a user associated with the free text query;
obtaining popular-travel information, wherein the popular-travel information comprises information about travel that is popular with users; and
deriving the origin location from the free text query, the user information, and the popular-travel information.

6. The system of claim 3, wherein the system comprises the destination-location derivation module and the destination-location derivation module is configured to perform operations comprising:
obtaining user information about a user associated with the free text query;
obtaining popular-travel information, wherein the popular-travel information comprises information about travel that is popular with users; and
deriving the destination location from the free text query, the user information, and the popular-travel information.

7. The system of claim 3, wherein the system comprises the departure-date derivation module and the departure-date derivation module is configured to perform operations comprising:
obtaining user information about a user associated with the free text query;
obtaining popular-travel information, wherein the popular-travel information comprises information about travel that is popular with users; and
deriving the departure date from the free text query, the user information, and the popular-travel information.

8. The system of claim 3, wherein the travel query further expressly specifies a duration of stay or a return date, wherein the duration of stay or the return date is expressly identified as such, and wherein the system further comprises:
a return-date derivation module, wherein generating the travel query comprises deriving the return date by the return-date derivation module.

9. The system of claim 8, wherein the return-date derivation module is configured to perform operations comprising:
obtaining user information about a user associated with the free text query;
obtaining popular-travel information, wherein the popular-travel information comprises information about travel that is popular with users; and
deriving the return date from the free text query, the user information, and the popular-travel information.

10. The system of claim 1, wherein the operations further comprise:

obtaining user information about a user associated with the free text query;

obtaining popular-travel information, wherein the popular-travel information comprises information about travel that is popular with users;

and deriving one or more of the origin location, the destination location, and the departure date from the free text query, the user information, and the popular-travel information.

11. A computer-implemented method, comprising:

receiving, by one or more computing devices associated with a general search engine, a free text query, wherein the free text query is input by a user into a search interface for the general search engine presented on a client computing device;

deriving, by the one or more computing devices and using the free text query, terms corresponding to particular travel constraints including terms corresponding to an origin location, a destination location, and a departure date, each having a respective probability of being related to a query for travel information;

determining, by the one or more computing devices, whether a combined probability of the terms being related to a query for travel information exceeds a threshold value;

in response to determining that the combined probability exceeds the threshold value:

generating, by the one or more computing devices, a travel query from the terms derived from the free text query, wherein the generated travel query expressly specifies the derived origin location, destination location, and departure date as travel constraints, and wherein each of the origin location, the destination location, and the departure date travel constraints are expressly identified as such in the travel query; and submitting, by the one or more computing devices, the travel query to a travel search engine distinct from the general search engine to obtain travel search results based on the travel search query and to present the travel search results based on the travel search query via the client computing device; and in response to the combined probability of the terms being related to the query for travel information not exceeding the threshold value, generating, by the one or more computing devices via the general search engine, search results that satisfy the free text query without using the travel search engine and presenting via the client computing device the search results that satisfy the free text query input into the general search engine.

12. The method of claim 11, wherein the free text query comprises text in a natural language form.

13. The method of claim 11, further comprising:

obtaining, by the one or more computing devices, user information about a user associated with the free text query;

obtaining, by the one or more computing devices, popular-travel information, wherein the popular-travel information comprises information about travel that is popular with users; and generating, by the one or more computing devices, the travel query from the free text query, the user information, and the popular-travel information.

14. The method of claim 13, wherein the popular-travel information comprises information about travel that is popular with users who share one or more characteristics with the user.

15. The method of claim 13, wherein the user information identifies one or more of:

user travel preferences;
a user location;
past user origin locations;
past user destination locations;
a past user travel cost for travel that comprises the past user origin locations and the past user destination locations;
past user destination types;
past user departure dates;
past user durations of stay; and
user contacts and the location of the user contacts.

16. The method of claim 15, wherein generating the travel query comprises generating a travel query for air travel, and wherein, when the user information identifies past user origin locations and past user destination locations, the past user origin locations and past user destination locations comprise cities that have airports.

17. The method of claim 15, wherein, when the user information identifies past user destination types, the past user destination types comprising one or more of beach destinations, skiing destinations, mountain destinations, national park destinations, and romantic destinations.

18. The method of claim 15, wherein the user information identifies user contacts and the location of the contacts and wherein the method further comprises:

obtaining, by the one or more computing devices, information identifying the user contacts and the location of the user contacts from one or more social networks of the user.

19. The method of claim 13, wherein the popular-travel information identifies one or more of:

popular origin locations;
popular destination locations;
estimated travel cost for travel that comprises the popular origin locations and the popular destination locations;
popular destination types;
popular departure dates
popular durations of stay; and
events and the location of the events.

20. The method of claim 19, wherein, when the popular-travel information identifies popular origin locations, the method further comprises:

selecting, by the one or more computing devices, the popular origin locations from all origin locations within a predetermined maximum distance from a current user location, wherein the predetermined maximum distance is measured in terms of time of travel, cost of travel, or distance of travel from the current user location.

21. The method of claim 19, wherein, when the popular-travel information identifies popular destination locations, the method further comprises:

selecting, by the one or more computing devices, the popular destination locations from all destination locations outside a predetermined minimum distance from a current user location, wherein the predetermined minimum distance is measured in terms of time of travel, cost of travel, or distance of travel from the current user location.

22. The method of claim 19, wherein, when the popular-travel information identifies popular destination types, the popular destination types comprise one or more of beach destinations, skiing destinations, mountain destinations, national park destinations, and romantic destinations.

23. The method of claim 19, wherein, when the popular-travel information identifies events and the locations of the events, the method further comprises:

obtaining, by the one or more computing devices, information identifying the events and the location of the events from an online database of events.

24. The method of claim 19, wherein the popular-travel information further identifies:

weather conditions at the popular destination locations for a plurality of dates.

25. A non-transitory computer storage medium encoded with a computer program, the program comprising instructions that when executed by one or more computing devices cause the one or more computing devices to perform operations comprising:

receiving a free text query, wherein the free text query is input by a user into a search interface for a general search engine presented on a client computing device;

using the free text query to derive terms corresponding to particular travel constraints including terms corresponding to an origin location, a destination location, and a departure date, each having a respective probability of being related to a query for travel information;

determining whether a combined probability of the terms being related to a query for travel information exceeds a threshold value;

in response to determining that the combined probability exceeds the threshold value:

generating a travel query from the terms derived from the free text query, wherein the generated travel query expressly specifies the derived origin location, destination location, and departure date as travel constraints, and wherein each of the origin location, the destination location, and departure date travel constraints are expressly identified as such in the travel query; and submitting the travel query to a travel search engine distinct from the general search engine to obtain travel search results based on the travel search query and to present the travel search results based on the travel search query via the client computing device; and in response to the combined probability of the terms being related to the query for travel information not exceeding the threshold value, generating, by the general search engine, search results that satisfy the free text query without using the travel search engine and presenting via the client computing device the search results that satisfy the free text query input into the general search engine.

26. The system of claim 1, wherein generating the travel query includes concatenating the derived terms describing the origin location, the destination location, and the departure date.

27. The system of claim 1, wherein generating the travel query includes identifying the derived term corresponding to the origin location as the origin location in the travel query.

28. The system of claim 1, comprising:

in response to submitting the travel query, providing a travel interface to the client device, the user interface including fields for the travel constraints that are pre-populated with the corresponding terms derived from the free text query.

29. The system of claim 1, comprising:

determining that the free text query is likely a travel related query prior to generating the travel query, wherein determining that the free text query is likely a travel related query comprises determining probability values associated with the derived terms corresponding to the particular travel constraints, combining the probability values, and comparing the combined probability value to a threshold value.

30. The system of claim 1, wherein the free text query is received at a general search engine interface.

* * * * *